US012399448B2

(12) United States Patent
Nodera et al.

(10) Patent No.: US 12,399,448 B2
(45) Date of Patent: Aug. 26, 2025

(54) TONER CONTAINER AND IMAGE FORMING APPARATUS

(71) Applicants: Kentaro Nodera, Kanagawa (JP); Tatsuya Kubo, Kanagawa (JP); Hideo Yoshizawa, Kanagawa (JP)

(72) Inventors: Kentaro Nodera, Kanagawa (JP); Tatsuya Kubo, Kanagawa (JP); Hideo Yoshizawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/420,837

(22) Filed: Jan. 24, 2024

(65) Prior Publication Data

US 2024/0272566 A1 Aug. 15, 2024

(30) Foreign Application Priority Data

Feb. 10, 2023 (JP) ................................ 2023-019009

(51) Int. Cl.
*G03G 15/08* (2006.01)

(52) U.S. Cl.
CPC ..... *G03G 15/0872* (2013.01); *G03G 15/0863* (2013.01); *G03G 2215/0668* (2013.01); *G03G 2215/0675* (2013.01); *G03G 2215/0697* (2013.01)

(58) Field of Classification Search
CPC ....................... G03G 15/0863; G03G 15/0872
USPC ......................................... 399/120, 252, 262
See application file for complete search history.

(56) References Cited

U.S. PATENT DOCUMENTS

| | | | | |
|---|---|---|---|---|
| 8,934,813 | B2 * | 1/2015 | Hosokawa | G03G 15/0872 399/119 |
| 9,448,507 | B2 * | 9/2016 | Suzuki | G03G 15/0886 |
| 2013/0330105 | A1 | 12/2013 | Komatsu et al. | |
| 2014/0321885 | A1 | 10/2014 | Fujimori et al. | |
| 2014/0321886 | A1 | 10/2014 | Kikuchi et al. | |
| 2015/0323884 | A1 | 11/2015 | Kikuchi et al. | |
| 2015/0346635 | A1 | 12/2015 | Nodera et al. | |
| 2016/0004184 | A1 | 1/2016 | Kikuchi et al. | |
| 2016/0363887 | A1 | 12/2016 | Nodera et al. | |
| 2017/0168418 | A1 | 6/2017 | Takami et al. | |

(Continued)

FOREIGN PATENT DOCUMENTS

| | | |
|---|---|---|
| JP | 2013-254170 A | 12/2013 |
| JP | 2014-199399 A | 10/2014 |

(Continued)

*Primary Examiner* — Hoan H Tran
(74) *Attorney, Agent, or Firm* — XSENSUS LLP

(57) ABSTRACT

A toner container is attachable to and detachable from a body of an image forming apparatus and includes a substantially cylindrical container body and a substantially cylindrical cap. The container body conveys toner stored inside the container body. The cap has a through hole through which a toner conveying nozzle disposed in the body of the image forming apparatus is to be inserted into the container body. The through hole is in a central portion of the cap. The cap has a fitted portion to be fitted with a fitting portion disposed in the body of the image forming apparatus to position the cap non-rotatably to the body of the image forming apparatus. The fitted portion is disposed in each of an upper portion and a lower portion of the cap when the cap is attached to the body of the image forming apparatus.

17 Claims, 5 Drawing Sheets

(56) References Cited

U.S. PATENT DOCUMENTS

| | | | |
|---|---|---|---|
| 2017/0363987 | A1 | 12/2017 | Nodera et al. |
| 2018/0348698 | A1 | 12/2018 | Tamaki et al. |
| 2020/0033751 | A1 | 1/2020 | Matsumoto et al. |
| 2020/0033752 | A1 | 1/2020 | Kubo et al. |
| 2020/0183302 | A1 | 6/2020 | Nodera et al. |
| 2021/0033997 | A1 | 2/2021 | Kubo et al. |
| 2021/0034007 | A1 | 2/2021 | Tamaki et al. |
| 2021/0080864 | A1 | 3/2021 | Nodera et al. |
| 2022/0342347 | A1 | 10/2022 | Nodera et al. |

FOREIGN PATENT DOCUMENTS

| | | | |
|---|---|---|---|
| JP | 2022080152 | * | 5/2022 |
| TW | 202209021 | * | 3/2022 |

* cited by examiner

TONER CONTAINER AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-019009, filed on Feb. 10, 2023, in the Japan Patent Office, the entire disclosure of which is hereby incorporated by reference herein.

BACKGROUND

Technical Field

Embodiments of the present disclosure relate to a toner container that stores toner therein, and an image forming apparatus such as a copier, a printer, a facsimile, or a multifunction peripheral thereof including the toner container.

Related Art

Image forming apparatuses such as copiers and printers are widely known in which a substantially cylindrical toner container attached to and detached from a body of an image forming apparatus is disposed.

SUMMARY

In an embodiment of the present disclosure, there is provided a toner container that is attachable to and detachable from a body of an image forming apparatus and includes a substantially cylindrical container body and a substantially cylindrical cap. The container body conveys toner stored inside the container body. The cap has a through hole through which a toner conveying nozzle disposed in the body of the image forming apparatus is to be inserted into the container body. The through hole is in a central portion of the cap. The cap has a fitted portion to be fitted with a fitting portion disposed in the body of the image forming apparatus to position the cap non-rotatably to the body of the image forming apparatus. The fitted portion is disposed in each of an upper portion and a lower portion of the cap when the cap is attached to the body of the image forming apparatus.

In another embodiment of the present disclosure, there is provided an image forming apparatus that includes a plurality of first toner containers and a second toner container. The plurality of first toner containers are arranged in a body of the image forming apparatus. Each of the plurality of first toner containers is attachable to and detachable from a body of the image forming apparatus and includes a substantially cylindrical container body and a substantially cylindrical cap. The container body conveys toner stored inside the container body. The cap has a through hole through which a toner conveying nozzle disposed in the body of the image forming apparatus is inserted into the container body. The through hole is in a central portion of the cap. The cap has a fitted portion to be fitted with a fitting portion disposed in the body of the image forming apparatus to position the cap non-rotatably to the body of the image forming apparatus. The fitted portion is disposed in each of an upper portion and a lower portion of the cap when the cap is attached to the body of the image forming apparatus. The second toner container is disposed adjacent to one of the plurality of first toner containers in the body of the image forming apparatus and includes a substantially cylindrical container body and a substantially cylindrical cap. The container body conveys toner stored inside the container body. The cap has a through hole through which a toner conveying nozzle disposed in the body of the image forming apparatus is inserted into the container body. The through hole is in a central portion of the cap. The cap has a fitted portion to be fitted with a fitting portion disposed in the body of the image forming apparatus to position the cap non-rotatably to the body of the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
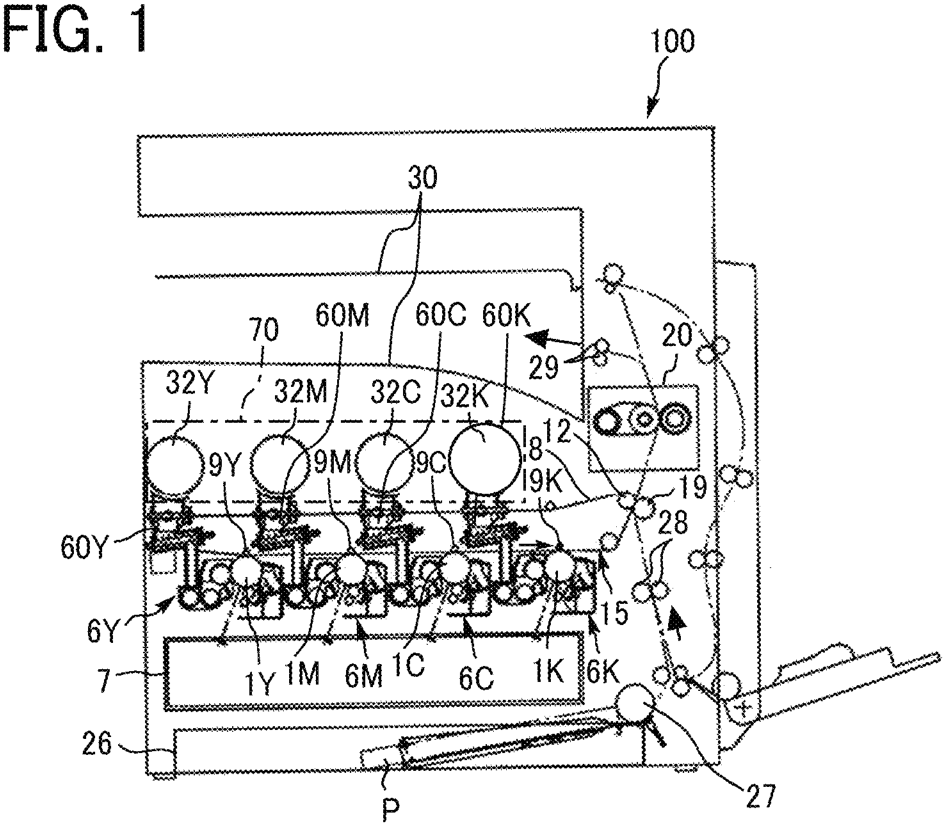
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. Like reference signs are assigned to like elements or components and descriptions of those elements or components may be simplified or omitted.

A configuration and operation of an image forming apparatus 100 is described below. As illustrated in FIG. 1, four toner containers 32Y, 32M, 32C, and 32K corresponding to colors of yellow, magenta, cyan, and black, respectively, are detachably (i.e., replaceably) arranged in a toner container housing 70 (see FIG. 5) above a body of the image forming apparatus 100. These toner containers 32Y, 32M, 32C, and 32K are manually attached to and detached from the body of the image forming apparatus 100 by an operator such as a user. An intermediate transfer unit 15 is disposed below the toner container housing 70. Image forming devices 6Y, 6M, 6C, and 6K corresponding to colors of yellow, magenta, cyan, and black, respectively, are arranged side by side to face an intermediate transfer belt 8 of the intermediate transfer unit 15. Toner supply devices 90 are disposed below the toner containers 32Y, 32M, 32C, and 32K. Toner contained in the toner containers 32Y, 32M, 32C, and 32K is supplied (replenished) by the toner supply devices 90, into developing devices of the image forming devices 6Y, 6M, 6C, and 6K.

Figure 2:
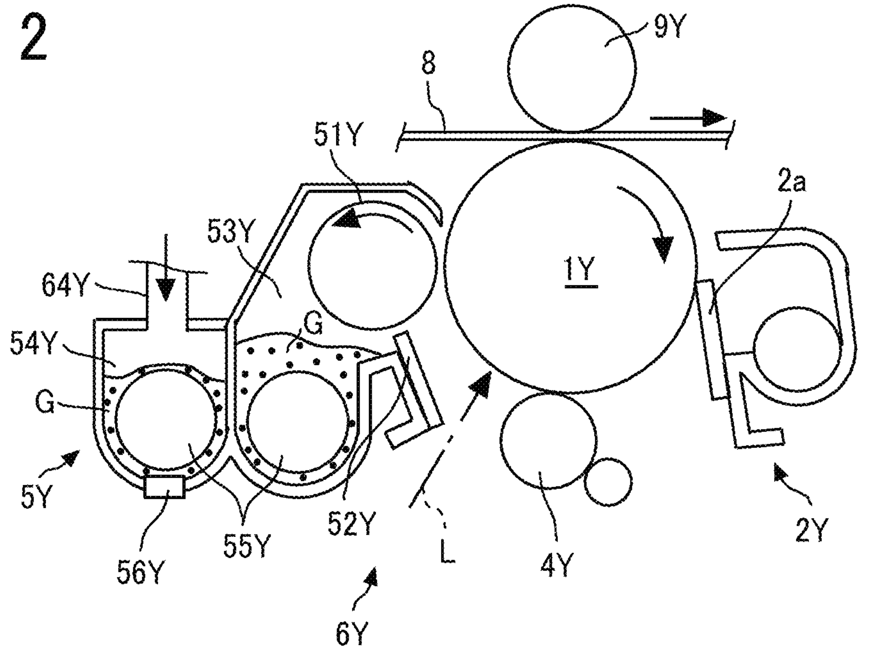
FIG. 2 is a cross-sectional view of an image forming device of the image forming apparatus in FIG. 1.

With reference to FIG. 2, the image forming device 6Y for yellow includes a photoconductor drum 1Y, a charging device 4Y, a developing device 5Y, a cleaning device 2Y, and an electric-charge removing device disposed around the photoconductor drum 1Y. Image forming processes (i.e., charging process, exposure process, development process, transfer process, cleaning process, and electric-charge removing process) are executed on the photoconductor drum 1Y. Thus, a yellow toner image is formed on the surface of the photoconductor drum 1Y.

The other three image forming devices 6M, 6C, and 6K have substantially the same configuration as that of the image forming device 6Y for yellow except for the color of toner used therein and the configuration of the toner container 32K for black having a larger capacity, and form magenta, cyan, and black toner images. Only the image forming unit 6Y is described below and descriptions of the other three image forming units 6M, 6C, and 6K are appropriately omitted.

As illustrated in FIG. 2, a drive motor drives to rotate the photoconductor drum 1Y in a clockwise direction. The charging device 4Y uniformly charges the surface of the photoconductor drum 1Y (a charging process). When the surface of the photoconductor drum 1Y reaches a position at which the surface of the photoconductor drum 1Y is irradiated with a laser beam L emitted from an exposure device 7 (see FIG. 1), the photoconductor drum 1Y is scanned with the laser beam L at the position. Thus, an electrostatic latent image corresponding to yellow is formed on the photoconductor drum 1Y (an exposure process).

When the surface of the photoconductor drum 1Y reaches a position facing the developing device 5Y, the electrostatic latent image is developed with toner into a yellow toner image (a development process). When the surface of the photoconductor drum 1Y bearing the toner image reaches a position facing a primary transfer roller 9Y via the intermediate transfer belt 8, the toner image on the photoconductor drum 1Y is transferred onto the intermediate transfer belt 8 (a primary transfer process). After the primary transfer process, a small amount of toner may remain untransferred on the photoconductor drum 1Y.

When the surface of the photoconductor drum 1Y reaches a position opposite the cleaning device 2Y, a cleaning blade 2*a* of the cleaning device 2Y mechanically collects the untransferred toner on the photoconductor drum 1Y (a cleaning process). Finally, the surface of the photoconductor drum 1Y reaches a position facing the electric-charge removing device, and residual potential on the photoconductor drum 1Y is removed at this position (an electric-charge removing process). Thus, a series of image forming processes executed on the surface of the photoconductor drum 1Y is completed.

The other image forming devices 6M, 6C, and 6K perform the series of image forming processes described above in substantially the same manner as the image forming device 6Y for yellow. In other words, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Then, toner images formed on the photoconductor drums 1Y, 1M, 1C, and 1K through the development step are transferred and superimposed onto the intermediate transfer belt 8. Thus, a color toner image is formed on the intermediate transfer belt 8.

With reference to FIG. 1, the intermediate transfer unit 15 includes the intermediate transfer belt 8, the four primary transfer rollers 9Y, 9M, 9C, and 9K, a secondary-transfer counter roller 12, multiple tension rollers, and an intermediate-transfer-belt cleaner. The intermediate transfer belt 8 is stretched around and supported by the multiple rollers and is rotated in the direction indicated by arrow illustrated in FIG. 1 as one of the multiple rollers that serves as a drive roller rotates (i.e., the secondary-transfer counter roller 12).

The four primary transfer rollers 9Y, 9M, 9C, and 9K are pressed against the corresponding photoconductor drums 1Y, 1M, 1C, and 1K, respectively, via the intermediate transfer belt 8 to form primary transfer nips. A primary transfer bias opposite in polarity to toner is applied to the primary transfer rollers 9Y, 9M, 9C, and 9K. The intermediate transfer belt 8 travels in the direction (counterclockwise) indicated by an arrow in FIG. 1 and sequentially passes through the primary transfer nips of the four primary transfer rollers 9Y, 9M, 9C, and 9K. As a result, the single-color toner images on the photoconductor drums 1Y, 1M, 1C, and 1K, having the respective colors, are primarily transferred and superimposed onto the intermediate transfer belt 8, thereby forming the multicolor toner image (a primary transfer process).

Subsequently, the intermediate transfer belt 8 onto which the toner images of the respective colors are transferred and superimposed reaches a position opposite a secondary transfer roller 19. At this position, the intermediate transfer belt 8 is nipped between the secondary-transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At this time, the untransferred toner that has not been transferred onto the sheet P remains on the surface of the intermediate transfer belt 8. The surface of the intermediate transfer belt 8 then reaches a position opposite the intermediate-transfer-belt cleaner. At the position, the intermediate-transfer-belt cleaner collects the untransferred toner from the surface of the intermediate transfer belt 8. Thus, a series of transfer processes performed on the intermediate transfer belt 8 is completed.

The sheet P is conveyed from a sheet feeder 26 disposed in a lower portion of the apparatus body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 temporarily stops at a position of the roller nip between the rollers of the registration roller pair 28 that has stopped rotating. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

Subsequently, the sheet P, onto which the color toner image is transferred at the secondary transfer nip, is conveyed to a position of a fixing device 20. Then, at this position, the color toner image transferred to the surface of the sheet P is fixed on the sheet P by heat and pressure of a fixing belt and a pressing roller. Subsequently, the sheet P is conveyed through the rollers of an output roller pair 29 and ejected to the outside of the image forming apparatus 100. The sheets P ejected by the output roller pair 29 to the outside of the image forming apparatus 100 are sequentially stacked as output images on a stack tray 30. Thus, a series of image forming processes performed by the image forming apparatus 100 is completed.

A detailed description is provided of a configuration and operation of the developing device 5Y of the image forming device 6Y with reference to FIG. 2. The developing device 5Y includes a developing roller 51Y disposed opposite the photoconductor drum 1Y, a doctor blade 52Y disposed opposite the developing roller 51Y, two conveying screws 55Y disposed in developer housings 53Y and 54Y, and a toner concentration sensor 56Y to detect concentration of toner in developer G. The developing roller 51Y includes a magnet and a sleeve. The magnet is fixed inside the developing roller 51Y. The sleeve rotates around the magnet. The developer housings 53Y and 54Y contain the two-component developer G including carrier (i.e., carrier particles) and toner (i.e., toner particles). The developer housing 54Y communicates, via an opening on an upper side thereof, with a downward toner conveyance passage 64Y.

The developing device 5Y described above operates as follows. The sleeve of the developing roller 51Y rotates in a direction indicated by an arrow in FIG. 2. The developer G is carried on the developing roller 51Y by a magnetic field generated by the magnet. As the sleeve rotates, the developer G moves along the outer circumferential surface of the developing roller 51Y.

The developer G in the developing device 5Y is adjusted so that the ratio of toner (toner concentration) in the developer G is within a specified range. More specifically, the toner supply device 90 (see FIG. 3) supplies toner (as powder) from the toner container 32Y to the developer housing 54Y according to the toner consumption in the developing device 5Y. The configuration and operation of the toner supply device are described in detail below.

The two conveying screws 55Y mix and stir the developer G with the toner supplied to the developer housing 54Y while circulating with the developer G in the two developer housings 53Y and 54Y. In this case, the developer G moves in the direction perpendicular to the surface of the plane on which FIG. 2 is illustrated. The toner in the developer G is electrically charged by friction with the carrier, so that the toner is attracted to the carrier. Both the toner and the carrier are borne on the developing roller 51Y due to a magnetic force generated on the developing roller 51Y.

The developer G borne on the developing roller 51Y is conveyed in the direction indicated by arrow in FIG. 2 and reaches a position opposite the doctor blade 52Y. At this position, the doctor blade 52Y adjusts the amount of the developer G on the developing roller 51Y to an appropriate amount. Thereafter, the developer G on the developing roller 51Y is conveyed to a position opposite the photoconductor drum 1Y (i.e., which is a development area). The toner is attracted to the electrostatic latent image formed on the photoconductor drum 1Y by an electric field generated in the developing area. As the sleeve rotates, the developer G remaining on the developing roller 51Y reaches an upper part of the developer housing 53Y and separates from the developing roller 51Y.

Figure 3:
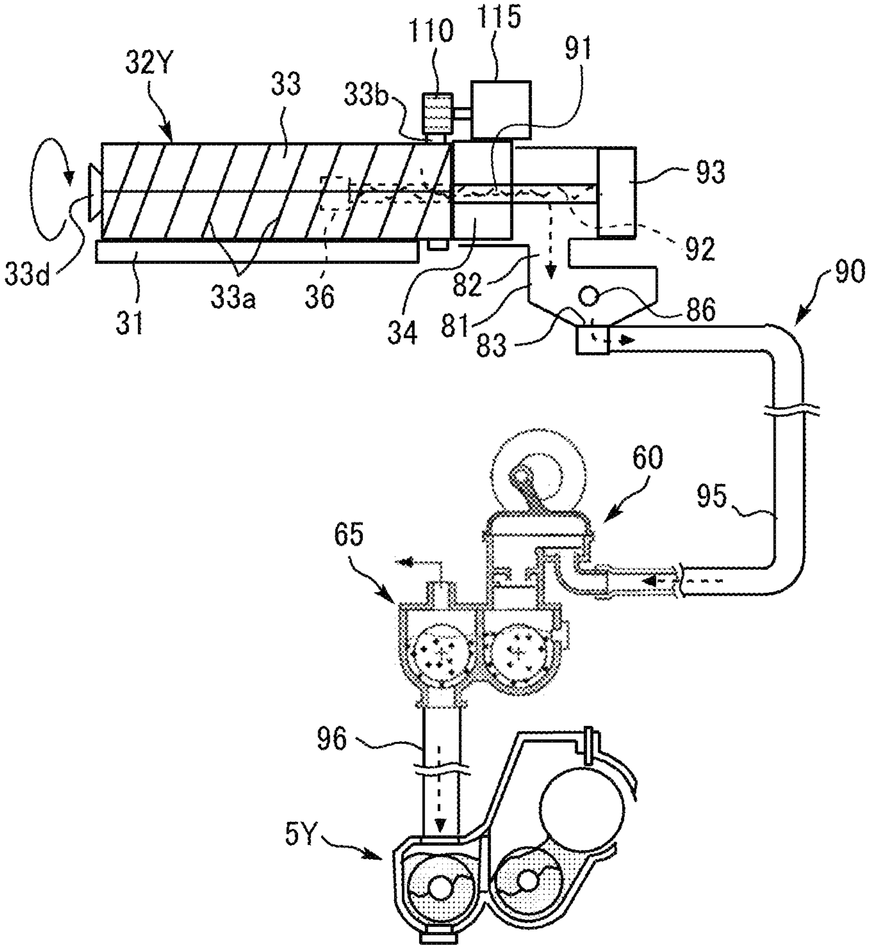
FIG. 3 is a diagram illustrating a toner container installed on a toner supply device, according to an embodiment of the present disclosure.

With reference to FIG. 3, a description is given of the toner supply device 90 in detail below. The toner supply device 90 drives to rotate a container body 33 of the toner container 32Y (serving as a powder container) disposed in a mount 31 of the toner container housing 70 (see FIG. 1) in a specified direction (e.g., in the direction indicated by arrow in FIG. 3), discharges the toner (serving as powder) contained in the toner container 32Y to the outside of the toner container 32Y, and guides the toner to the developing device 5Y serving as a supplied portion via a sub-hopper 65. The toner supply device 90 includes a toner supply path (i.e., a toner conveyance path). In FIG. 3, the arrangement direction of the toner container 32Y, the toner supply device 90, and the developing device 5Y is changed to facilitate understanding. Actually, the longitudinal axes of the toner container 32Y and a part of the toner supply device 90 are perpendicular to the plane on which FIG. 3 is illustrated (see FIG. 1). In addition, the orientation and arrangement of conveying tubes 95 and 96 are also simplified and illustrated.

The toner supply devices 90 supply the color toners contained in the toner containers 32Y, 32M, 32C, and 32K installed in the mount 31 in the body of the image forming apparatus 100 (the toner container housing 70) to the corresponding developing devices 5Y, 5M, 5C, and 5K, respectively. The amount of toner supplied to each developing device 5 is determined based on the amount of toner consumed in the corresponding developing device 5. The four toner supply devices 90 have substantially the same configuration except the color of the toner used in the image forming processes. Specifically, with reference to FIGS. 3, 4A, and 4B, when the toner container 32Y is attached to the mount 31 (the toner container housing 70) of the body of the image forming apparatus 100, a toner conveying nozzle 91 (as the nozzle) of the body of the image forming apparatus 100 pushes and moves a shutter 36 of the toner container 32Y. As a result, the toner conveying nozzle 91 is inserted into the toner container 32Y (the container body 33) via a through hole 34*a*. Accordingly, the toner contained in the toner container 32Y can be discharged through the toner conveying nozzle 91. The toner container 32Y includes a grip 33*d* at a bottom portion (on the left side in FIG. 3) of the toner container 32Y so that a user easily handles and installs the toner container 32Y to the mount 31. The grip 33*d* has an outer diameter smaller than the outer diameter of the container body 33. The user grips the grip 33*d* to install the toner container 32Y in the mount 31 and take out the toner container 32Y from the mount 31.

With reference to FIG. 3, the toner container 32Y includes the substantially cylindrical container body 33 having a spiral groove 33*a* extending in the longitudinal direction (the left and right direction in FIG. 3, and the axial direction of the container body 33). Specifically, the spiral groove 33*a* is formed from an outer circumferential surface toward an inner circumferential surface of the container body 33 so that a rotation of the container body 33 convey the toner in the container body 33 from the left to the right in FIG. 3. The toner conveyed from the left to the right in FIG. 3 inside the container body 33 is discharged to the outside of the toner container 32Y through the toner conveying nozzle 91. The toner container 32Y includes a gear 33*b* meshing with a drive gear 110 of the body of the image forming apparatus 100. The gear 33*b* is disposed on the outer circumferential surface of the container body 33 on a head side (on the right side of the container body 33 in FIG. 3). When the toner container 32Y is installed to the mount 31, the gear 33*b* of the container body 33 meshes with the drive gear 110 of the body of the image forming apparatus 100. As a drive motor 115 is driven, the driving force (rotational drive) is transmitted from the drive gear 110 to the gear 33*b*, thus driving the container body 33 to rotate. In other words, the drive motor 115 and the drive gear 110 function as a drive mechanism to drive to rotate the container body 33. A description is given of the toner container 32Y in further detail below.

With reference to FIG. 3, a conveying screw 92 is disposed inside the toner conveying nozzle 91. As a motor 93 drives to rotate the conveying screw 92, the conveying screw 92 conveys the toner flowing into the toner conveying nozzle 91 from an opening 91*a* (serving as an inlet port) in the toner container 32Y from the left to the right in FIG. 3. Thus, the toner is discharged through an outlet port of the toner conveying nozzle 91 to a hopper 81. The hopper 81 is disposed below the outlet port of the toner conveying nozzle 91 via a dropping path 82. The toner stored in the hopper 81 is conveyed to the developing device 5Y downstream from the hopper 81 by a conveyor. The conveyance configuration by the conveyor in FIG. 3 is described below. A suction port 83 is disposed in the bottom portion of the hopper 81 and coupled to one end of the conveying tube 95 as a tube. The conveying tube 95 is made of a flexible rubber material with low affinity for toner, and the other end of the conveying tube 95 is coupled to a developer pump 60 (serving as a diaphragm pump). The developer pump 60 is coupled to the developing device 5Y via the sub-hopper 65 and the conveying tube 96. With such a configuration of the toner supply device 90, the drive motor 115 as the drive mechanism rotates the container body 33 of the toner container 32Y to discharge the toner stored in the toner container 32Y to the outside of the toner container 32Y through the toner conveying nozzle 91. The toner discharged from the toner container 32Y falls through the dropping path 82 and is stored in the hopper 81. The developer pump 60 operates to suck the toner stored in the hopper 81 together with air from the suction port 83 and convey the toner from the developer pump 60 to the sub-hopper 65 through the conveying tube 95. The toner conveyed to and stored in the sub-hopper 65 is appropriately supplied into the developing device 5Y via the conveying tube 96. In other words, the toner in the toner container 32Y is conveyed in the direction indicated by dashed arrows in FIG. 3. The conveyor is not limited to the above-described configuration, and for example, the toner stored in the hopper 81 may be conveyed directly to the developing device 5Y by a screw disposed in the hopper 81.

A toner sensor 86 is disposed near the suction port 83 and indirectly detects a state in which the toner contained in the toner container 32Y is depleted (i.e., toner end state) or a state in which the toner contained in the toner container 32Y is nearly depleted (i.e., toner near end state). The toner is discharged from the toner container 32Y based on the detection result of the toner sensor 86. Specifically, for example, a piezoelectric sensor or a light transmission sensor can be used as the toner sensor 86. A height of the detection surface of the toner sensor 86 is set so that the amount of toner (deposition height) deposited above the suction port 83 is a target value. A drive timing and a drive duration of the drive motor 115 are controlled to rotationally drive the toner container 32Y (container body 33) based on the detection result of the toner sensor 86. Specifically, when the toner sensor 86 detects that toner is not deposited on a detection position of the toner sensor 86, the drive motor 115 is driven for a specified time. When the toner sensor 86 detects that toner is present on the detection position, the drive motor 115 stops. If the toner sensor 86 continuously detects that toner does not exist at the detection position even when the above-described control is performed repeatedly, a controller of the image forming apparatus determines that the toner contained in the toner container 32Y is depleted (i.e., toner end state) or that the toner contained in the toner container 32Y is nearly depleted (i.e., toner near end state).

Figure 5:
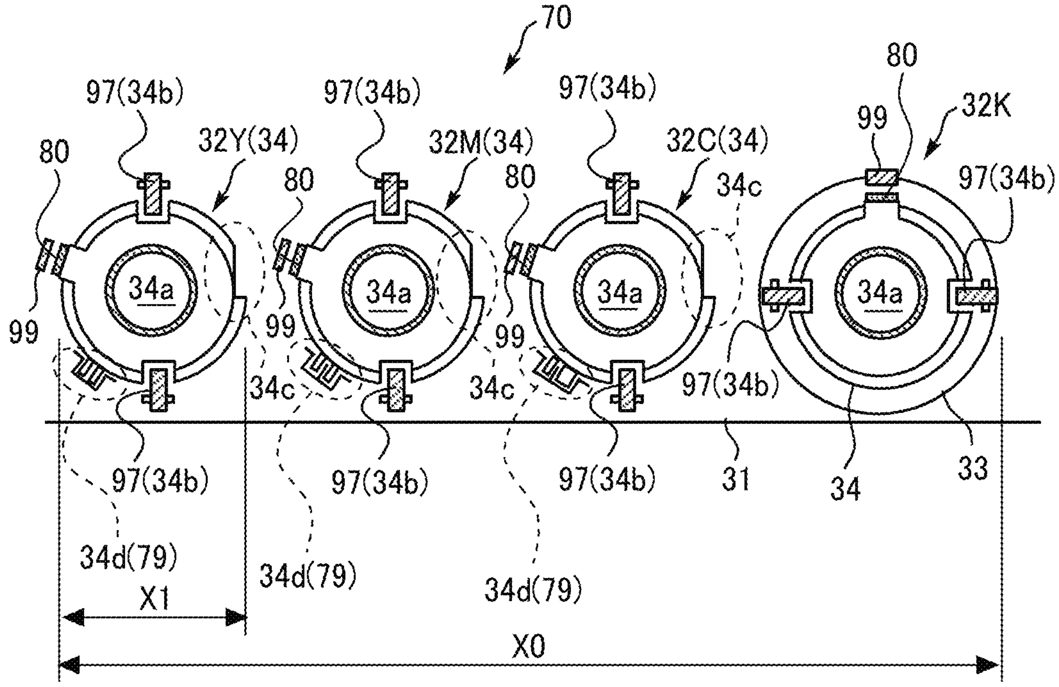
FIG. 5 is a front view of a plurality of toner containers attached to a body of an image forming apparatus according to an embodiment of the present disclosure.
Figure 6A:
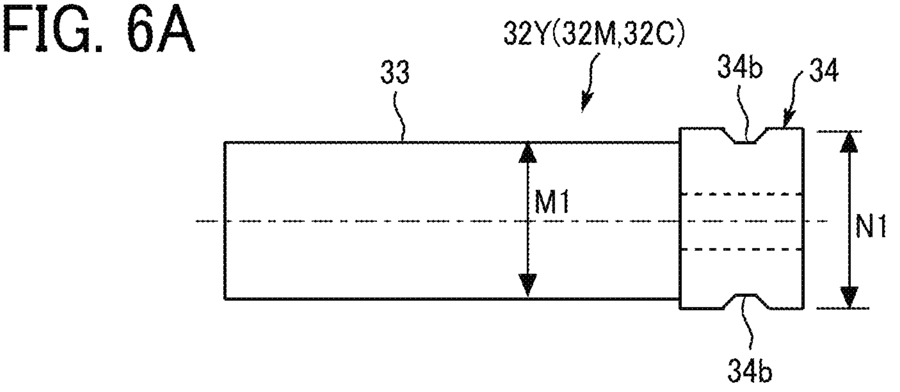
FIG. 6A is a side view of a toner container for primary color.
Figure 6B:
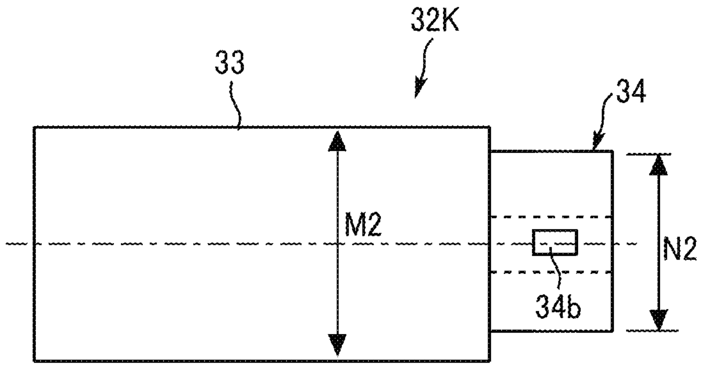
FIG. 6B is a side view of a toner container for black (second toner container)

A description is given of a configuration and an operation of the toner container 32Y (32M, 32C, or 32K) according to the present embodiment below. As described above, in the present embodiment, the toner containers 32Y, 32M, 32C, and 32K for four colors are installed to be attachable to and detachable from the body of the image forming apparatus 100 (the toner container housing 70). The three toner containers 32Y, 32M, and 32C (serving as first toner containers) for primary colors (yellow, magenta, and cyan) are formed in substantially the same shape except for an incompatible-shape portion 34*d* (which can be installed by the secondary processing) described below, and are commonized. As illustrated in FIG. 5, the three toner containers 32Y, 32M, and 32C for primary colors are arranged in parallel in a substantially horizontal direction (lateral direction) in the toner container housing 70 (the body of the image forming apparatus 100). On the other hand, as illustrated in FIGS. 5, 6A and 6B, the toner container 32K for black (serving as a second toner container) is not commonized with the toner containers 32Y, 32M, and 32C for primary colors, and is increased in capacity due to frequent use of printing using black. As illustrated in FIG. 5, the black toner container 32K (second toner container) is installed in the toner container housing 70 (the body of the image forming apparatus 100) to be adjacent to one (the cyan toner container 32C) of the plurality of toner containers 32Y, 32M, and 32C for primary colors in a substantially horizontal direction (lateral direction).

Specifically, as illustrated in FIG. 6A, the toner containers 32Y, 32M, and 32C (first toner containers) for primary colors are formed such that the outer diameter M1 of the container body 33 thereof and the outer diameter N1 of a cap 34 thereof substantially match each other (M1≈N1). As illustrated in FIG. 6B, in the present embodiment, the outer diameter M2 of the container body 33 of the toner container 32K (second toner container) for black is larger than the outer diameter N2 of the cap 34 of the toner container 32K (second toner container) for black (M2>N2). As illustrated in FIGS. 6A and 6B, the outer diameter M1 of the container body 33 of any of the toner containers 32Y, 32M, and 32C (first toner containers) for primary colors is smaller than the outer diameter M2 of the container body 33 of the black toner container 32K (second toner container) (M1>M2), and only the black toner container 32K is increased in capacity. The outer diameter N2 of the cap 34 of the toner container 32K (second toner container) for black is substantially equal to the outer diameter N1 of the cap 34 of the toner containers 32Y, 32M, and 32C (first toner container) for primary colors (N1≈N2). In the specification of the present application, the above-described "outer diameter" of the container body 33 or the cap 34 is defined as an outer diameter of the outer circumferential surface in an imaginary shape that is substantially a cylinder, even if the container body 33 or the cap 34 is not a complete cylinder and has some irregularities on the outer circumferential surface.

More specifically, each of the three toner containers 32Y, 32M, and 32C for primary colors and the toner container 32K for black (second toner containers) includes a substantially cylindrical container body 33 and a substantially cylindrical (cap-shaped) cap 34. The container body 33 conveys toner stored therein toward the cap 34. With reference to FIG. 4, the through hole 34*a* for inserting the toner conveying nozzle 91 disposed in the body of the image forming apparatus 100 (the toner container housing 70) into the container body 33 is formed in a central portion (a portion corresponding to the rotation center of the container body 33) of the cap 34. In conjunction with the attachment of the toner container 32Y, 32M, 32C, or 32K to the body of the image forming apparatus 100, in the cap 34, a lever 97 serving as a fitting portion disposed in the body of the image forming apparatus 100 (the mount 31 of the toner container housing 70) is fitted with a hole portion 34*b* serving as a fitted portion and is non-rotatably positioned relative to the body of the image forming apparatus 100 (the mount 31).

As described above, in any of the toner containers 32Y, 32M, 32C, and 32K according to the present embodiment, toner is discharged to the outside of the toner container 32Y, 32M, 32C, or 32K by the toner conveying nozzle 91 inserted in the container body 33 via the through hole 34*a* formed in the central portion of the cap 34. Thus, the failure that the lower portion of the cap 34 is contaminated with toner is less likely to occur than in the case where toner is discharged to the outside of the toner containers 32Y, 32M, 32C, and 32K from a toner ejection port formed at the bottom of the cap 34.

Figure 4A:
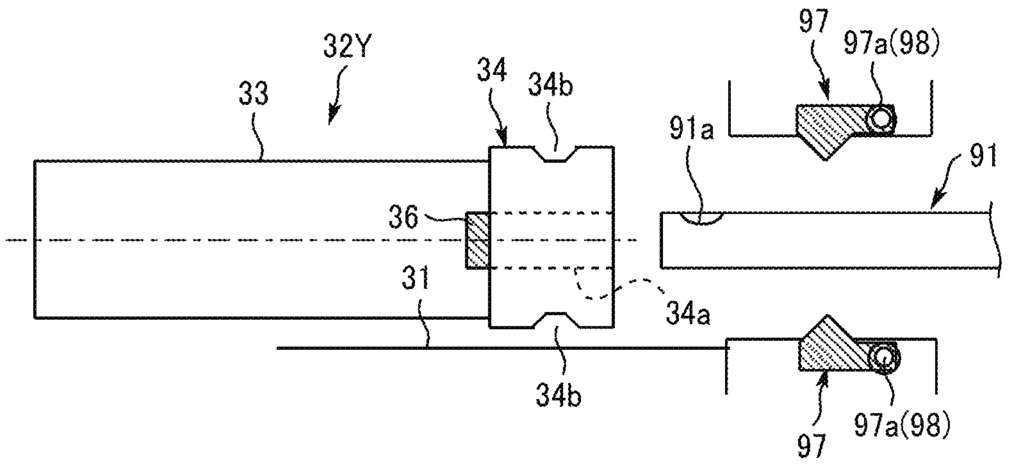
FIGS. 4A and 4B are side views of a toner container, illustrating operations of attaching the toner container to a body of an image forming apparatus, according to an embodiment of the present disclosure.
Figure 4B:
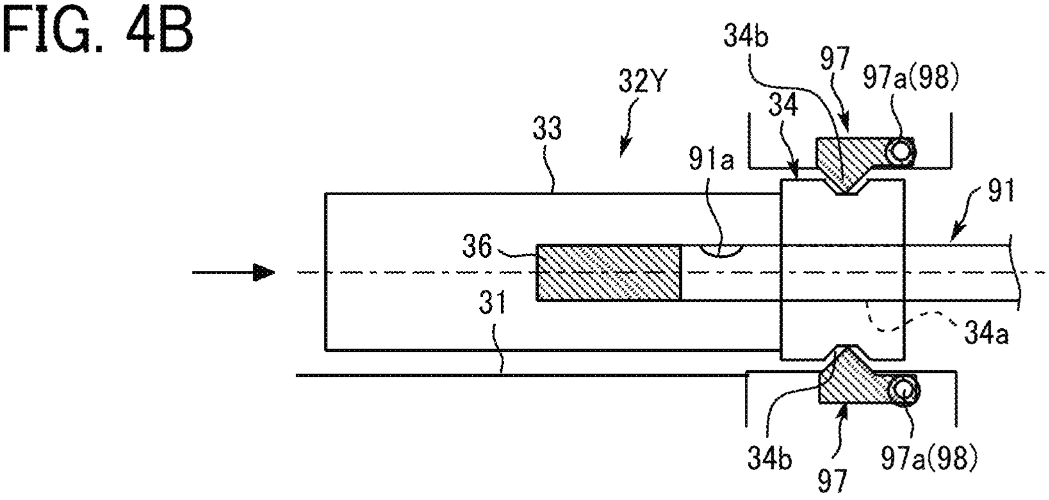

With reference to FIGS. 4A to 6B, in the present embodiment, the hole portions 34*b* serving as the fitted portions are formed in the shape of grooves (or in the shape of through holes) at opposing positions (positions 180 degrees out of phase) on the outer circumferential surface of the cap 34. The levers 97 serving as the fitting portions are disposed in the toner container housing 70 at positions corresponding to the two hole portions 34*b* in the cap 34 and are biased by torsion springs 98 serving as biasing members in a direction to fit the hole portions 34*b*. The lever 97 is disposed to be rotatable around a shaft 97*a*, and a winding portion of the torsion spring 98 (two leg portions are hooked to enable the above-described biasing) is inserted to the shaft 97*a*. The toner container housing 70 is provided with the lever 97, a projection for restricting the rotation of the lever 97 in a biasing direction, and a housing case for holding, for example, a reading device 99 and a mount-side incompatible-shape portion 79 to be described below. As illustrated in FIG. 4A, when the toner container 32Y (32M, 32C, or 32K) is pushed in by a user toward the right side in FIG. 4A (the rear side in the attachment direction of the toner container housing 70), the cap 34 eventually pushes the lever 97 in a direction against the biasing direction. As illustrated in FIG. 4B, when the hole portion 2*b* of the cap 34 has reached the position of the lever 97, the lever 97 is fitted with the hole portion 2*b*, and the position of the cap 34 in the toner container housing 70 is determined (the cap 34 is held so as not to rotate in conjunction with the rotation of the container body 33). The fitted portion and the fitting portion described above are not limited to those of the present embodiment, and various types of configurations can be used within the scope of the technical idea of the present disclosure.

With reference to FIG. 5 (and FIGS. 4A, 4B, 6A, and 6B), in the present embodiment, the hole portions 34*b* as the fitted portions of each of the three toner containers 32Y, 32M, and 32C for primary colors are disposed in an upper portion and a lower portion of the cap 34 attached to the body of the image forming apparatus 100 (toner container housing 70). The levers 97 as the fitting portions of the body of the image forming apparatus 100 (the toner container housing 70) are disposed above and below the cap 34 so as to sandwich the cap 34, in alignment with the two hole portions 34*b* of the cap 34 of each of the toner containers 32Y, 32M, and 32C.

Figure 7:
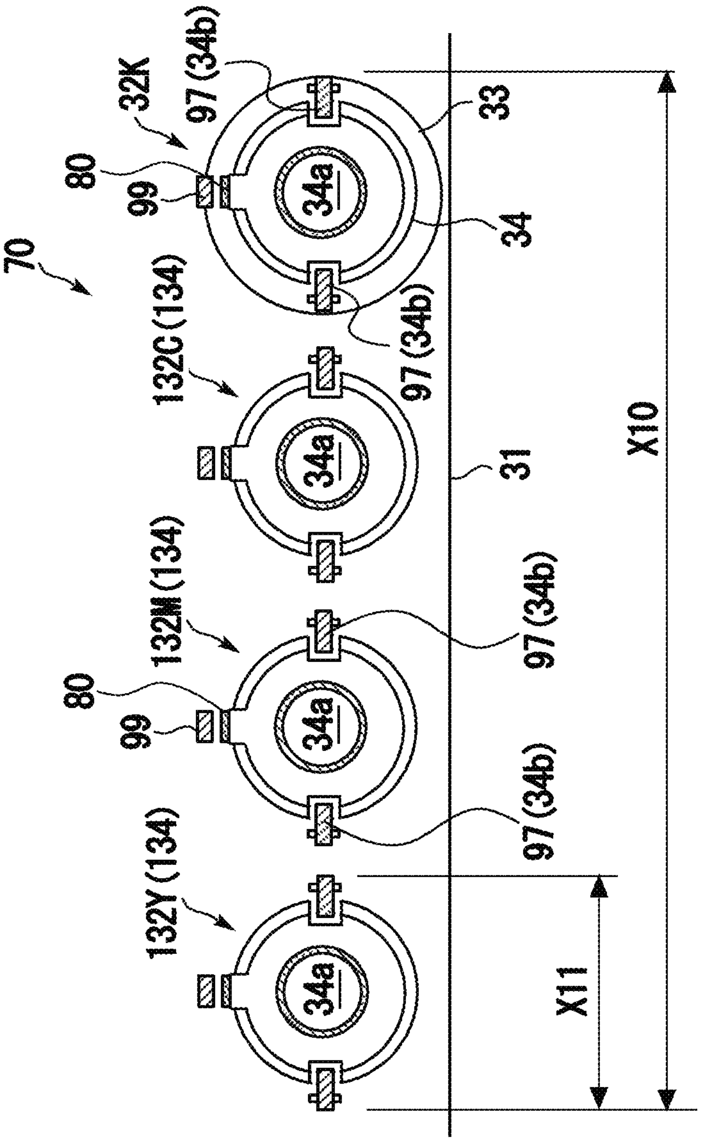
FIG. 7 is a front view of a plurality of toner containers attached to a body of an image forming apparatus, as a comparative example.

Thus, any of the three toner containers 32Y, 32M, and 32C for primary colors is provided with the hole portions 34*b* (fitted portion) in the upper portion and lower portion of the cap 34, and the levers 97 (fitting portions) are disposed at the positions corresponding to the hole portions 34*b* in the body of the image forming apparatus 100. The lateral space X1 for installing each of the toner containers 32Y, 32M, and 32C (caps 34) in the body of the image forming apparatus 100 (toner container housing 70) can be set smaller than the lateral space X11 for installing each of toner containers 132Y, 132M, and 132C (caps 134) in the case where hole portions 34*b* (fitted portions) are disposed on both sides of the cap 134 as in the toner containers 132Y, 132M, and 132C illustrated as the comparative example in FIG. 7. In other words, X1<X11 is satisfied with reference to and comparison with FIGS. 5 and 7. In particular, when the three toner containers 32Y, 32M, and 32C (the caps 34) are arranged in parallel in the lateral direction in the body of the image forming apparatus 100 (the toner container housing 70), the difference in the three lateral spaces turn to be large. In other words, with reference to FIGS. 5 and 7, the space (3×X1) for installing the three toner containers 32Y, 32M, and 32C is significantly smaller than the space (3×X11) of the comparative example of FIG. 7 (3×X1<<3×X11). Unlike the toner container 32K for black, the toner containers 32Y, 32M, and 32C for primary colors have almost no difference of outer diameters between the container body 33 and the cap 34. If the lever 97 (and a portion of the housing case that holds the lever 97) of the body of the image forming apparatus 100 is placed in a space between the caps 34 adjacent to each other, the overall space in the lateral direction turns to be large. However, when the lever 97 of the body of the image forming apparatus 100 is not disposed in the space between the caps 34 adjacent to each other (e.g., the hole portions 34*b* are disposed at the upper portion and the lower portion in the cap 34), the overall space in the lateral direction is reduced.

In contrast, the toner container 32K for black (which is the second toner container attached to the body of the image forming apparatus 100) is provided with the hole portions 34*b* (serving as the fitted portions) on the right side and the left side of the cap 34, and a lever 97 (serving as the fitting portion) is disposed at the position corresponding to the hole portions 34*b* in the body of the image forming apparatus 100. In the toner container 32K (second toner container) for black, the outer diameter M2 of the container body 33 is larger than the outer diameter N2 of the cap 34. As illustrated in FIG. 5, when viewed from the cap 34 as the front side, the lateral space for arranging the levers 97 on both sides of the body of the image forming apparatus 100 causes such an arrangement to be adopted. As a whole, the lateral space X0 for installing the four toner containers 32Y, 32M, 32C, and 32K in the image forming apparatus 100 illustrated in FIG. 5 is considerably smaller than the lateral space X10 for installing the four toner containers 132Y, 132M, 132C, and 132K in the image forming apparatus 100 illustrated as the comparative example in FIG. 7 (X0<<X10). Accordingly, the image forming apparatus 100 (the toner container housing 70) according to the present embodiment is reduced in size in the lateral direction as compared to that illustrated in FIG. 7.

In the present embodiment, each of the caps 34 of the plurality of toner containers 32Y, 32M, and 32C for primary colors is provided with an identification (ID) chip 80 that can communicate with the reading device 99 of the body of the image forming apparatus 100 in a side surface (a left side surface) farther from the toner container 32K (second toner container) for black. This is to avoid interference of the ID chip 80 with the lever 97 (fitting portion) disposed in the body of the image forming apparatus 100. The hole portions 34*b* (fitted portions) are disposed in the upper and lower portions of the cap 34 of each of the plurality of toner containers 32Y, 32M, and 32C for primary colors. For the same reason, the cap 34 of the toner container 32K (second toner container) for black is provided with the ID chip 80 at its top, which can communicate with the reading device 99 of the body of the image forming apparatus 100. Information exchanged between the reading device 99 of the body of the image forming apparatus 100 and the ID chips 80 in the toner containers 32Y, 32M, 32C, and 32K includes information of the toner in the toner containers (e.g., color, capacity, and manufacturing lot) and information on the presence or absence of recycling.

With reference to FIG. 5, in the present embodiment, the cap 34 of each of the plurality of toner containers 32Y, 32M, and 32C for primary colors is provided with a cutout portion 34*c*, which is recessed as compared with the other portions of the circumferential surface of the cap, on a side surface (right side surface) closer to the toner container 32K (second toner container) for black. The cutout portion 34*c* is recessed as compared with the other portions of the circumferential surface of the cap. Forming the cutout portion 34*c* in the outer circumferential portion of the cap 34 in this manner can prevent interference of the cap 34 with the ID chip 80 or the reading device 99 of the adjacent toner container.

With reference to FIG. 5, in the present embodiment, the cap 34 of each of the plurality of toner containers 32Y, 32M, and 32C for primary colors are provided with the incompatible-shape portion 34*d* for distinguishing the cap 34 from the caps 34 of the other two of the plurality of toner containers 32Y, 32M, and 32C. In the body of the image forming apparatus 100 (toner container housing 70), the mount-side incompatible-shape portion 79 that can fit the incompatible-shape portion 34*d* is disposed in accordance with the shape of the incompatible-shape portion 34*d*. Accordingly, even if a user attempts to install any one of the toner containers 32Y, 32M, and 32C for primary colors to the mount 31 for another color, the incompatible-shape portion 34*d* interferes with the mount-side incompatible-shape portion 79 and prevents an installation error. Thus, color mixture due to the installation error can be avoided. The toner container 32K for black has a larger capacity than any of the toner containers 32Y, 32M, and 32C for primary colors, and the toner container 32K as a whole is incompatible with any of the toner containers 32Y, 32M, and 32C for primary colors.

As described above, the toner containers 32Y, 32M, and 32C for primary colors according to the present embodiment are toner containers that are attachable to and detachable from the body of the image forming apparatus 100. Each of the toner containers 32Y, 32M, and 32C for primary colors is provided with the substantially cylindrical container body 33 that conveys toner stored therein toward the cap 34. Each of the toner containers 32Y, 32M, and 32C for primary colors is provided with the substantially cylindrical cap 34 that has the through hole 34*a* at a central portion thereof for inserting the toner conveying nozzle 91 disposed in the body of the image forming apparatus 100 into the container body 33. When the levers 97 (fitting portions) disposed in the body of the image forming apparatus 100 are fitted with the hole portions 34*b*, the substantially cylindrical cap 34 is non-rotatably positioned in the body of the image forming apparatus 100. The hole portion 34*b* is arranged in each of the upper and lower portions of the cap 34 attached to the body of the image forming apparatus 100. As a result, the lateral space for installing the toner containers 32Y, 32M, and 32C is less likely to increase in the body of the image forming apparatus 100.

In the present embodiment, only toner is stored in the toner containers 32Y, 32M, 32C, and 32K. However, in some embodiments, toner containers may contain two-component developer including toner and carrier to be used in an image forming apparatus in which the two-component developer is appropriately supplied to developing devices. Even in such a case, similar effects to the above-described embodiments are also attained.

In the present embodiment, at least one or all of the image forming units 6Y, 6M, 6C, and 6K may be integrated as a process cartridge. Even in such a case, similar effects to the above-described embodiments are also attained. The term "process cartridge" used in the present disclosure defines a unit that includes an image bearer united with at least one of a charging device to charge the image bearer, a developing device to develop a latent image on the image bearer, and a cleaning device to clean the image bearer, and that is removably attached to a body of an image forming apparatus.

Embodiments of the present disclosure are not limited to the above-described embodiments and it is apparent that the above-described embodiments can be appropriately modified within the scope of the technical idea of the present disclosure in addition to what is suggested in the above-described embodiments. The number, position, shape, and so forth of components are not limited to those of the present embodiments and modifications, and may be the number, position, shape, and so forth that are suitable for implementing the present disclosure.

Aspects of the present disclosure may be, for example, combinations of first to ninth aspects as follows.

First Aspect

A toner container (e.g., the toner container 32Y) is attachable to and detachable from a body of an image forming apparatus (e.g., the image forming apparatus 100). The toner container includes a substantially cylindrical container body (e.g., the container body 33) and a substantially cylindrical cap (e.g., the cap 34). The container body conveys toner stored inside the container body toward the cap. The cap is provided with a through hole (e.g., the through hole 34*a*) through which a toner conveying nozzle (e.g., the toner conveying nozzle 91) disposed in the body of the image forming apparatus is to be inserted into the container body. The through hole is disposed in a central portion of the cap. The cap has a fitted portion (e.g., the hole portion 34*b*) to be fitted with a fitting portion (e.g., the lever 97) disposed in the body of the image forming apparatus to position the cap non-rotatably to the body of the image forming apparatus. The fitted portion is disposed in each of an upper portion and a lower portion of the cap when the cap is attached to the body of the image forming apparatus.

Second Aspect

In the toner container (e.g., the toner container 32Y) according to the first aspect, the fitted portion (e.g., the hole portion 34*b*) is a hole portion, and the fitting portion (e.g., the lever 97) is a lever biased by a biasing member (e.g., the torsion spring 98) in a direction in which the fitting portion fits the hole portion. The outer diameter of the container body (e.g., the container body 33) and the outer diameter of the cap (e.g., the cap 34) substantially match each other.

Third Aspect

An image forming apparatus (e.g., the image forming apparatus 100) includes: a plurality of first toner containers (e.g., the toner containers 32Y, 32M, and 32C) including the toner container (e.g., the toner container 32Y) according to the first or second aspect are arranged in the body of the image forming apparatus; and a second toner container (e.g., the toner container 32K) adjacent to any one of the plurality of first toner containers. The second toner container includes a substantially cylindrical container body (e.g., the container body 33) and a substantially cylindrical cap (e.g., the cap 34). The container body conveys toner stored inside the container body toward the cap. The cap is provided with a through hole (e.g., the through hole 34*a*) through which a toner conveying nozzle (e.g., the toner conveying nozzle 91) disposed in the body of the image forming apparatus is inserted into the container body. The through hole is disposed in a central portion of the cap. The cap has a fitted portion (e.g., the hole portion 34*b*) fitted with a fitting portion (e.g., the lever 97) disposed in the body of the image forming apparatus to position non-rotatably to the body of the image forming apparatus.

Fourth Aspect

In the image forming apparatus (e.g., the image forming apparatus 100) according to the third aspect, an outer diameter of the container body (e.g., the container body 33) of the second toner container (e.g., the toner container 32K) is larger than an outer diameter of the cap (e.g., the cap 34) of the second toner container. An outer diameter of the container body of each of the plurality of first toner containers (e.g., the toner containers 32Y, 32M, and 32C) is smaller than the outer diameter of the container body of the second toner container.

Fifth Aspect

In the image forming apparatus (e.g., the image forming apparatus 100) according to the third or fourth aspect, the outer diameter of the cap (e.g., the cap 34) of the second toner container (e.g., the toner container 32K) and an outer diameter of the cap of each of the plurality of first toner containers (e.g., the toner containers 32Y, 32M, and 32C) substantially match each other.

Sixth Aspect

In the image forming apparatus (e.g., the image forming apparatus 100) according to any one of the third to fifth aspects, the fitted portion (e.g., the hole portion 34*b*) of the second toner container (e.g., the toner container 32K) is disposed on a right side and a left side of the cap (e.g., the cap 34) of the second toner container attached to the body of the image forming apparatus.

Seventh Aspect

In the image forming apparatus (e.g., the image forming apparatus 100) according to any one of the third to sixth aspects, the cap (e.g., the cap 34) of each of the plurality of first toner containers (32Y, 32M, and 32C) is provided with an identification (ID) chip on a side surface farther from the second toner container (e.g., the toner container 32K). The identification (ID) chip can communicate with the body of the image forming apparatus. The cap of the second toner container is provided with an ID chip at a top of the cap of the second toner container. The ID chip can communicate with the body of the image forming apparatus.

Eighth Aspect

In the image forming apparatus (e.g., the image forming apparatus 100) according to any one of the third to seventh aspects, the cap (e.g., the cap 34) of each of the plurality of first toner containers (32Y, 32M, and 32C) is provided with a cutout portion (e.g., the cutout portion 34*c*) on a side surface closer to the second toner container (e.g., the toner container 32K). The cutout portion is recessed as compared with a portion other than the cutout portion in the circumferential surface of the cap.

Ninth Aspect

In the image forming apparatus (e.g., the image forming apparatus 100) according to any one of the third to eighth aspects, the cap (e.g., the cap 34) of each of the plurality of first toner containers (32Y, 32M, and 32C) is provided with an incompatible-shape portion (e.g., the incompatible-shape portion 34*d*) that distinguishes each of the plurality of first toner containers (32Y, 32M, and 32C) from the other first toner containers of the plurality of first toner containers (32Y, 32M, and 32C).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner container to be attachable to and detachable from a body of an image forming apparatus, the toner container comprising:

a substantially cylindrical container body to convey toner stored inside the container body; and a substantially cylindrical cap having a through hole through which a toner conveying nozzle disposed in the body of the image forming apparatus is to be inserted into the container body, wherein the through hole is in a central portion of the cap, the cap has a fitted portion to be fitted with a fitting portion disposed in the body of the image forming apparatus to position the cap non-rotatably to the body of the image forming apparatus, and the fitted portion is disposed in each of an upper portion and a lower portion of the cap when the cap is attached to the body of the image forming apparatus.

2. The toner container according to claim 1, wherein the fitted portion is a hole portion to be fitted with a lever of the fitting portion biased by a biasing member in a direction in which the fitting portion fits the hole portion, and an outer diameter of the container body and an outer diameter of the cap substantially match each other.

3. The toner container according to claim 1, wherein the cap of the toner container has an identification (ID) chip to communicate with the body of the image forming apparatus, the fitted portion includes a first fitted portion on the upper portion of the cap and a second fitted portion on the lower portion of the cap, and the ID chip is disposed between the first fitted portion and the second fitted portion when the toner container is viewed from the cap.

4. The toner container according to claim 3, wherein the ID chip is disposed in an inclined direction when the toner container is viewed from the cap.

5. The toner container according to claim 3, wherein the cap of the toner container is provided with an incompatible-shape portion for distinguishing the cap from another toner container, and the incompatible-shape portion is disposed between the second fitted portion and the ID chip when the toner container is viewed from the cap.

6. An image forming apparatus, comprising:

a plurality of first toner containers arranged in the image forming apparatus, each first toner container of the plurality of first toner containers to be attachable to and detachable from the image forming apparatus, and each first toner container of the plurality of first toner containers including:

a container to convey toner stored inside the container; and a cap having a through hole through which a toner conveying nozzle disposed in the image forming apparatus is inserted into the container, wherein the through hole is in a central portion of the cap, the cap has a first fitted hole fitted with a first lever disposed in the image forming apparatus and a second fitted hole with a second lever disposed in the image forming apparatus to position the cap non-rotatably to the image forming apparatus, and the first fitted hole is disposed in an upper portion of the cap and the second fitted hole is disposed in a lower portin of the cap when the cap is attached to the image forming apparatus; and a second toner container disposed adjacent to one first toner container of the plurality of first toner containers in the image forming apparatus, the second toner container including:

a container to convey toner stored inside the container; and a cap having a through hole through which a toner conveying nozzle disposed in the image forming apparatus is inserted into the container, wherein the through hole is in a central portion of the cap, and the cap has a fitted hole to be fitted with a lever disposed in the image forming apparatus to position the cap non-rotatably to the image forming apparatus.

7. The image forming apparatus according to claim 6, wherein an outer diameter of the container of the second toner container is larger than an outer diameter of the cap of the second toner container, and an outer diameter of the container of each first toner container of the plurality of first toner containers is smaller than the outer diameter of the container of the second toner container.

8. The image forming apparatus according to claim 7, wherein the outer diameter of the cap of the second toner container and the outer diameter of the cap of each first toner container of the plurality of first toner containers substantially match each other.

9. The image forming apparatus according to claim 7, wherein the fitted hole of the second toner container is disposed on a right side and a left side of the cap of the second toner container attached to the image forming apparatus.

10. The image forming apparatus according to claim 7, wherein the cap of each first toner container of the plurality of first toner containers is provided with an identification (ID) chip on a side surface farther from the second toner container, to communicate with the image forming apparatus, and the cap of the second toner container is provided with an ID chip at a top of the cap of the second toner container, to communicate with the image forming apparatus.

11. The image forming apparatus according to claim 10, wherein the cap of each of first toner container the plurality of first toner containers is provided with a recess on a side surface closer to the second toner container, and the recess is recessed as compared with another portion of a circumferential surface of the cap.

12. The image forming apparatus according to claim 6, wherein the cap of each first toner container of the plurality of first toner containers has an incompatible-shape portion that distinguishes each first toner container of the plurality of first toner containers from other first toner containers of the plurality of first toner containers.

13. A toner container to be attachable to and detachable from of an image forming apparatus, the toner container comprising:

a container to convey toner stored inside the container; and a cap having a through hole through which a toner conveying nozzle disposed in the image forming apparatus is to be inserted into the container, wherein the through hole is in a central portion of the cap, the cap bas a first fitted hole to be fitted with a first lever disposed in the image forming apparatus and a second fitted hole to be fitted with a second lever disposed in the image forming apparatus to position the cap non-rotatably to the image forming apparatus, and the first fitted hole is disposed in an upper portion of the cap and the second fitted hole is disposed in a lower portion of the cap when the cap is attached to the image forming apparatus.

14. The toner container according to claim 13, wherein the first lever is biased by a biasing spring in a direction in which the first lever fits the first fitted hole, the second lever is biased by a biasing spring in a direction in which the second lever fits the second fitted hole, and an outer diameter of the container and an outer diameter of the cap match each other.

15. The toner container according to claim 13, wherein the cap of the toner container has an identification (ID) chip to communicate with the image forming apparatus, and the ID chip is disposed between the first fitted hole and the second fitted hole when the toner container is viewed from the cap.

16. The toner container according to claim 15, wherein the ID chip is disposed in an inclined direction when the toner container is viewed from the cap.

17. The toner container according to claim 15, wherein the cap is provided with an incompatible-shape portion for distinguishing the cap from another toner container, and the incompatible-shape portion is disposed between the second fitted hole and the ID chip when the toner container is viewed from the cap.

* * * * *